3,413,214
HYDROGENATION PROCESS
Richmond B. Galbreath, Fanwood, N.J., assignor to Cities Service Research and Development Company, New York, N.Y., a corporation of Delaware
Filed Dec. 20, 1965, Ser. No. 514,845
9 Claims. (Cl. 208—143)

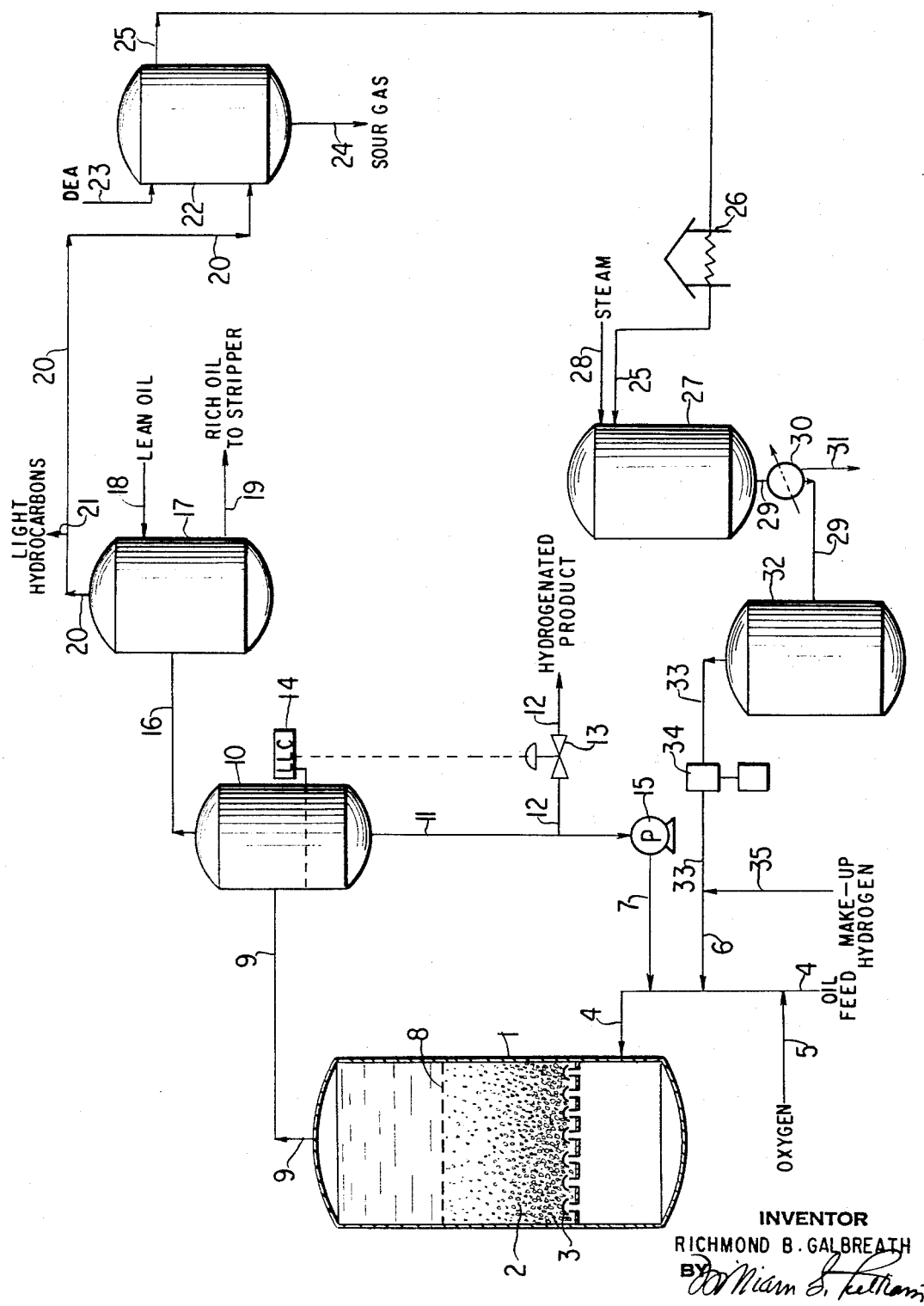

ABSTRACT OF THE DISCLOSURE

Hydrogenation of liquid hydrocarbons is carried out in the presence of hydrogen and a controlled amount of oxygen to hydrogenate a major portion of the liquid hydrocarbon feed and to oxidize a minor portion thereof, thereby producing a gaseous product containing carbon monoxide. The carbon monoxide content of the gaseous product is subsequently reacted with steam to form additional hydrogen which may be recycled to the hydrogenation zone.

---

The present invention relates to the conversion of liquid hydrocarbons and more particularly provides improvements in processes for hydrogenating liquid hydrocarbons.

It is known to treat liquid hydrocarbons, such as heavy hydrocarbon oils, with hydrogen at high pressure to effect a wide variety of reactions, including hydrodesulfurization, hydrocracking, color improvement and the like. A major factor in such hydrocarbon hydrogenation processes is the relatively high cost of conventional methods of producing hydrogen gas and supplying it under the requisite high pressure.

Accordingly, it is one object of the invention to provide an improved process for hydrogenating liquid hydrocarbons.

Another object of the invention is to provide an improved hydrogenation process whereby economies in the production and supply of hydrogen to the process are enabled.

It is a further object of the invention to provide an improved hydrogenation process whereby hydrogen gas can be produced in the process in high yield and at high pressures.

Various other objects and advantages will be apparent from the following detailed description of the invention, and the novel features will be particularly pointed out hereinafter in connection with the claims appended hereto.

Briefly stated, the present invention contemplates carrying out the hydrogenation of liquid hydrocarbons at superatmospheric pressure in the presence of hydrogen gas and a controlled amount of oxygen gas to hydrogenate a major portion of a liquid hydrocarbon and to oxidize a minor portion thereof, thereby producing hydrogenated liquid hydrocarbon and generating a gaseous reaction product comprising carbon monoxide. The gaseous reaction product mixture is separated from the hydrogenated liquid hydrocarbon, and the carbon monoxide content thereof is subsequently reacted with steam to form an additional quantity of hydrogen. The hydrogen so produced is recycled to the hdyrogenation zone, optionally after being further enriched with hydrogen from an external source.

It will be seen that the present invention affords substantial economies in the supply of make-up hydrogen to the hydrogenation zone. Thus, the utilization of the gaseous mixture produced in the hydrogenation zone as a result to the partial oxidation reaction to produce additional hydrogen drastically reduces the make-up hydrogen requirement. In accordance with a preferred aspect of the invention, the reaction of the carbon monoxide component of the gaseous reaction product mixture with steam is carried out at superatmospheric pressure, substantially the same as that at which the hydrogenation reaction is effected, thereby affording further economies in pressuring-up the hydrogen rich gas stream recycled to the reactor.

The oxygen gas, in the presence of which the hydrogenation of the liquid hydrocarbon is conducted, may be air or oxygen-enriched air. However, I prefer to employ high purity oxygen (i.e. at least about 90% by volume oxygen) for this purpose.

The present invention is applicable to any of the well-known processes for treating liquid hydrocarbons with hydrogen. Thus, the invention may be used in processes wherein it is desired to crack, desulfurize or improve the color or stability of liquid hydrocarbons by treatment with hydrogen. Furthermore, such processes may be affected in the presence of a suitable catalyst by fixed or fluid bed techniques. However, the invention appears to have particular applicability to high pressure hydrocracking and/or hydrodesulfurization treatments using so-called ebullated catalytic bed techniques, such as are disclosed in U.S. Patents 2,987,465 and Re. 25,770 of Edwin S. Johanson.

In adidtion to carbon monoxide, the gaseous reaction product separated from the hydrogenated liquid hydrocarbon generally comprises varying amounts of water, carbon dioxide, light hydrocarbon gases and unreacted hydrogen. When air is used as the oxygen gas, the gaseous reaction product also includes nitrogen. Furthermore, when the liquid hydrocarbon feed contains sulfur, hydrogen sulfide is also present in the gaseous mixture.

The reaction of the carbon monoxide component of the gaseous mixture with steam to form hydrogen may be carried out in the presence of a conventional shift catalyst at substantially the pressure at which the hydrogenation reaction is effected. The water normally present in the gaseous reaction product may be utilized to react with the carbon monoxide in the shift reaction. However, since the volume ratio of $H_2O$ to $CO$ in the gaseous mixture generally does not exceed about 1:2, it is desirable to conduct the shift reaction in the presure of added steam so as to provide a $H_2O:CO$ volume ratio of at least about 1:1, and thereby reacting substantially all of the carbon monoxide.

It should be noted that hydrogen sulfide has a poisoning effect on conventional shift catalyst. Therefore, when a substantial quantity of $H_2S$ is also present in the gaseous mixture resulting from the hydrogenation reaction, it is desirable to remove the $H_2S$ prior to conducting the shift reaction.

The invention will now be further described with reference to the appended drawing which diagrammatically illustrates a preferred processing scheme for practicing the invention.

Referring to the drawing, the hydrogenation reactor represented by reference numberal 1 is generally a forged vesel capable of withstanding the superatmospheric pressures and high temperatures normally associated with hydrogenation operations. The reactor 1 contains a mass of hydrogenation catalyst particles 2 supported on a conventional bubble cap tray 3 or other suitable means.

As is well-known in the art, suitable hydrogenation catalysts include for instance, cobalt, iron, molybdenum, nickel, tungsten, cobalt-molybdenum, etc. Such catalysts as well as their sulfides and oxides, may be used alone or together with suitable catalysts such as naturally occurring clays, etc., or in combination with each other. The catalyst may also be supported on a suitable base such as alumina, silica, or silica-alumina. Generally speaking, the diameters of the catalyst particles range from about $\frac{1}{48}$ inch to about $\frac{1}{2}$ inch and preferably are in the form of elongated extrudates.

Fresh liquid hydrocarbon oil feed, which may for instance be a heavy oil, is passed through line 4 and mixed with oxygen-gas, a hydrogen-containing gas stream and liquid recycle, which are passed through lines 5, 6 and 7, respectively. The resultant admixture is charged to the lower portion of reactor 1 and passes upwardly through the bubble cap tray 3 which serves to uniformly distribute the liquid admixture through the catalyst bed to the hydrogenation zone of the reactor. The upflow liquid velocity at which the oil-gas mixture is passed through the catalyst bed is such that the catalyst particles are maintained in a state of ebullation, the gross mass of the bed expanding at least 10%, and usually not greater than about 300% over the volume which it occupies in a settled state. The upper level of the expanded ebullated catalyst bed is as denoted by reference numeral 8. Generally speaking, it is preferred that the upflow liquid velocity of the admixture be from about 5 to about 500 gallons per minute per square foot of horizontal cross-section of the ebullated mass, particularly from about 20 to about 120 gal./min./sq. ft. A more complete understanding of an ebullated bed hydrogenation process may be had by referring to the above-noted Johanson patents.

The hydrogen-containing gas stream passed through line 6 and mixed with hydrocarbon oil in line 4 is at least partly obtained by the novel improvements afforded by the present invention, as will hereinafter be more fully described. Preferably, the hydrogen-containing gas stream passed through line 4 contains at least 50% by volume, and particularly at least 70% by volume hydrogen.

The hydrogen-containing gas stream is advantageously supplied to the reactor 1 in an amount such as to provide an excess over that stoichiometrically required to effect the desired hydrogenation reaction. Accordingly, the gas stream is generally supplied to the reactor at a rate of from about 1,000 to about 10,000 standard cubic feet (s.c.f.) of hydrogen per barrel (bbl.) of fresh oil feed, preferably from about 3,000 to about 8,000 s.c.f./bbl.

The supply of oxygen gas through line 5 is carefully controlled in accordance with the invention so as to oxidize only a minor portion of the liquid hydrocarbon. For this purpose, I prefer to supply the oxygen gas to the hydrogenation zone in an amount of from about 1 to about 12% oxygen by weight of fresh oil feed supplied to the reactor. Particularly desirable results are obtained by supplying the oxygen gas to the reactor in an amount of from about 2 to about 9% by weight of the oil feed.

The hydrogenation process may be conducted under a suitable pressure, e.g. from about 800 to about 5000 p.s.i.g. The hydrogen partial pressure in reactor 1 may be between about 500 and about 4,000 p.s.i., with the range of 1,000 to 3,000 p.s.i. being preferred. Temperature in reactor 1 may advantageously range from about 400° F. to about 1500° F., depending on particular hydrogenation reaction desired. It is generally preferred to operate at a temperature between 750° F. and 950° F.

In the hydrocarbon conversion process contemplated by the invention, hydrogen is consumed resulting in the production of hydrogenated liquid hydrocarbon, and oxygen is consumed resulting in the generation of carbon monoxide as well as other gaseous conversion products such as carbon dioxide, steam and light hydrocarbon gases. Since hydrogen gas is generally supplied to the hydrogenation process in a stoichiometric excess, the gaseous mixture resulting from the reaction also contains unconsumed hydrogen.

The liquid-gas product mixture may be removed from the reactor through line 9 and passed to a liquid-gas separating unit 10. Liquid separated in separator 10 is removed therefrom through line 11, and at least a portion thereof is recovered as hydrogenated hydrocarbon product through line 12 provided with a valve 13. The operation of valve 13 may be controlled by means of a liquid level controller 14 which maintains a suitable level of liquid in separator unit 10. Another portion of the liquid recovered from separator 10 is preferably passed through line 7 by means of pump 15 and combined with the fresh oil feed charged to the reactor through line 4. Recycle of hydrogenated liquid hydrocarbon to the reactor serves to maintain the desired hydrogenation temperature. Recycle rates between about 1 and about 25 volumes of recycle liquid per volume of fresh oil feed are generally preferred.

The predominantly gaseous product mixture separated in separating unit 10 is removed therefrom through lines 16 and passed to an extraction tower 17. Lean oil is charged through line 18 to extraction tower 17 wherein it is caused to contact the predominantly gaseous product mixture under counter-current flow conditions. The rich oil extract is removed from the bottom of extraction tower 17 through line 19 and may be passed, if desired, to a stripping tower, not shown, to recover additional hydrogenated liquid hydrocarbon. The gaseous mixture remaining after extraction is removed from the extraction tower 17 through line 20. Light hydrocarbon gases, such as methane, ethane and the like may be vented from the gas stream through line 21.

As previously noted, when the gas stream contains substantial quantities of hydrogen sulfide, such as is obtained using as the hydrogenation feedstock an oil containing at least about 2% by weight sulfur, it is preferred to remove the $H_2S$ from the gas stream prior to converting carbon monoxide to hydrogen because of its poisoning effect on shift catalysts. Accordingly, hydrogen sulfide may be removed from the gas stream in diethanolamine (DEA) scrubber 22. Scrubbing the gaseous mixture with diethanol-amine (supplied through line 23) also serves to remove carbon dioxide. A solution of carbon dioxide and hydrogen sulfide in diethanolamine may be removed from the scrubber through line 24 and passed to a stripping unit, not shown. It will be appreciated that scrubber 22 may be operated using monoethanolamine as the scrubbing liquid in lieu of diethanolamine. Likewise, any other suitable sour gas removal system which can be operated at high pressure may be used.

The resultant gaseous effluent, which consists essentially of carbon monoxide, hydrogen and a small amount of steam is recovered from the scrubber 22 through line 25 and passed through a heating unit 26 to increase the temperature thereof to about 400° F. to about 800° F., and is then charged to a shift converter 27 together with a sufficient amount of additional steam through line 28, to provide an $H_2O:CO$ volume ratio of at least about 1:1.

The reaction of carbon monoxide with steam to form hydrogen, as well as carbon dioxide, is conducted in the presence of a conventional shift catalyst. Exemplary of shift catalysts are chromium-promoted iron oxide, alkalized iron and the like.

The gaseous mixture obtained from the shift reaction consists essentially of steam, hydrogen and carbon dioxide. This mixture is passed through line 29 from shift convertor 27 to condensor 30 wherein the steam content of the mixture is condensed and removed through line 31. The resultant mixture of carbon dioxide and at least about 50 volume percent hydrogen is then passed through line 29 to a surge tank 32.

The hydrogen-containing gaseous mixture may be withdrawn from surge tank 32 through line 33 at a controlled rate and compressed by means of compressor 34 to increase the pressure thereof to that required in the hydrogenation process, e.g. from about 500 to about 4,000 p.s.i. partial hydrogen pressure. If necessary or desirable, make-up hydogen may be supplied through line 35 and combined with the hydrogen-containing gas stream in line 33 to increase the hydrogen concentration thereof. The hydrogen-enriched gas stream is then flowed through line 6 and admixed with the oil feed-oxygen mixture charged to the hydrogenation reactor 1 through line 4, as previously explained.

It is particularly preferred to conduct the reaction of carbon monoxide and steam in shift convertor 27 at a superatmospheric pressure substantially the same as that in which the hydrogenation reaction is carried out. Thus, the pressure differential existing between shift convertor 27 and hydrogenation reactor 1 is preferably very small, e.g. less than about 300 p.s.i., preferably less than 150 p.s.i, and is due substantially solely to frictional pressure loss in the system By conducting the shift reaction at substantially the reactor pressure, economices in subsequently pressuring-up the hydrogen-containing gas stream recycled to the reactor are afforded.

Although not essential to the successful practice of the invention, a second diethanolamine scrubbing unit, not shown in the drawing, may be provided downstream of the shift convertor 27, for instance in line 29, to absorb carbon dioxide generated by the shift reaction. This practice enables supply of an essentially pure hydrogen gas stream to the hydrogenation reactor.

It will be appreciated from the above description that the present invention results in the generation of a substantial quantity of hydrogen, thereby affording savings in make-up hydrogen requirements. Thus, the present invention provides at least about 10% and generally greater than about 20% by volume of the total hydrogen requirement of the hydrogenation process.

A more complete understanding of the invention and the advantages thereof may be had by referring to the following specific and non-limitative example:

Using the apparatus arrangement described in reference to the drawing, a sour residuum containing about 3.0% by weight sulfur and having an API gravity of 9.9° is passed through line 4 at a rate of 10,000 bbls. per day (B/D) and mixed with oxygen supplied through line 5 at 210,000 lbs. per day. A hydrogen-containing gas stream is supplied through line 6 in the composition and rate indicated in Table 1, below:

TABLE 1.—COMPOSITION OF $H_2$ STREAM IN LINE 6

| Component | Rate | |
|---|---|---|
| | S.c.f./bbl. of feed | MM s.c.f.d |
| $H_2$ | 6,013 | 60.13 |
| CO | 75 | 0.75 |
| $CO_2$ | 388 | 3.88 |
| $CH_4C_2H_6$ | 465 | 4.65 |

Recycle liquid recovered from separator 10 is admixed with the fresh feed-gas mixture at a rate of 100,000 B/D.

The resultant admixture is charged to the hydrogenation reactor containing about 48,000 lbs. of 0.025 to 0.035 inch diameter cobalt-molybdate extrudates. The catalyst is maintained in an ebullated state by passing the oil-gas mixture through the catalyst bed at an upflow liquid velocity of about 50 gals. per minute per sq. foot of horizontal cross-section of the ebullated mass. The hydrogenation reactor is maintained at a temperature of 825° F. and at a total pressure of 3000 p.s.i.g., the hydrogen partial pressure being 2600 p.s.i.

Substantially the entire amount of oxygen and approximately 1400 s.c.f. of hydrogen per barrel of oil feed (14.0 MM s.c.f.d.) are consumed in the reactor. The resultant liquid-gas reaction product mixture is passed fromthe reactor 1 and separated in separator 10. The liquid reaction products, subsequently recovered as products of the process, are as noted in Tabe 2, while the gaseous products are as noted in Table 3.

TABLE 2

*Liquid products*

| | B/D |
|---|---|
| Naphtha | 2000 |
| Furnace oil | 4000 |
| Heavy gas oil | 3000 |
| Unconverted 1000° F.+liquids | 800 |
| Oxygenated liquids | 20 |

TABLE 3

*Gaseous products*

| Component: | MM s.c.f.d. (Total incl. unconsumed gas) |
|---|---|
| CO | 4.48 |
| $H_2O$ | 0.35 |
| $CO_2$ | 4.23 |
| $H_2$ | 46.13 |
| $H_2S$ | 0.81 |
| $CH_4$, $C_2H_6$ | 5.15 |

The separated predominantly gaseous mixture is passed from the separator 10 to an extraction column 17, wherein an additional 800 B/D of liquid are extracted and ultimately recovered. A porton of the light hydrocarbon gases along with about 1.0 MM s.c.f.d. of hydrogen and 0.25 MM s.c.f.d. of water vapor are then vented from the gaseous mixture through line 21. The resultant gaseous mixture is then charged to a diethanolamine stripping unit 22 to remove substantially all of the $H_2S$ and $CO_2$ contents therefrom.

The gaseous mixture recovered from the stripping unit 22 through line 25 is approximately as follows:

TABLE 4

*Composition of gaseous reaction mixture in line 25*

| Component: | MM s.c.f.d. |
|---|---|
| $H_2$ | 45.13 |
| CO | 4.48 |
| $CO_2$ | neg. |
| $H_2S$ | neg. |
| $H_2O$ | 0.15 |
| $CH_4$, $C_2H_6$ | 4.50 |

For the purpose of converting the carbon monoxide content of the gaseous mixture to hydrogen, the gas stream together with an additional 20.0 MM. s.c.f.d. of steam is charged to a shift convertor 27 containing chromium-promoted iron oxide as the catalyst. The shift conversion is carried out at a pressure of 2900 p.s.i.g. and a temperature of 600° F. The 100 p.s.i. pressure differential existing between shift convertor 27 and reactor 1 is due substantially solely to frictional pressure loss in the intervening process operations. Water is removed from the resultant gas stream by condensation. The composition of the gas stream after shift conversion and water removal is as follows:

TABLE 5

*Composition of gaseous mixture in line 33*

| Component: | MM s.c.f.d. |
|---|---|
| $H_2$ | 49.01 |
| CO | 0.60 |
| $CO_2$ | 3.88 |
| $CH_4$, $C_2H_6$ | 4.50 |

The gas mixture is compressed to increase the hydrogen partial pressure thereof to about 2600 p.s.i., and then mixed with a stream of make-up hydrogen having the following composition:

TABLE 6

*Composition of make-up hydrogen supplied through line 35*

| Component: | MM s.c.f.d. |
|---|---|
| $H_2$ | 11.12 |
| $CH_4$ | 0.15 |
| CO | 0.15 |

The composition of the combined hydrogen-containing gas stream passed to the hydrogenation reactor is, therefore, as set forth in Table 1.

To summarize the advantages of the present process, it will be noted that 14 MM s.c.f.d. of hydrogen are consumed in the hydrogenation process and 1.0 MM s.c.f.d. of hydrogen are lost in the venting of light hydrocarbon gases through line 21. Make-up hydrogen requirements for the hydrogenation process amount to 11.12 MM s.c.f.d., while a total of 3.88 MM s.c.f.d. of hydrogen are generated by carrying out the hydrogenation process in the presence of oxygen and utilizing the product gases to produce hydrogen. Accordingly, over 25% of the hydrogen required for the hydrogenation process is obtained by the practice of the present invention.

While the invention has been described above in connection with certain preferred embodiments thereof, it will be understood by those skilled in the art that various changes and modifications may be made without departing from the spirit and scope of the invention as expressed in the appended claims.

Therefore, I claim:

1. In a process for treating liquid hydrocarbons with hydrogen at superatmospheric pressure within a hydrogenation zone, the improvement which comprises:
   (a) carrying out the hydrogenation of the liquid hydrocarbon in the presence of from about one to about twelve percent oxygen by weight of the liquid hydrocarbon to hydrogenate a major portion of the liquid hydrocarbon and to oxidize a minor portion thereof, thereby producing hydrogenated liquid hydrocarbon and generating a gaseous reaction product mixture comprising carbon monoxide;
   (b) separating said gaseous reaction product mixture from said hydrogenated liquid hydrocarbon;
   (c) reacting the carbon monoxide content of said gaseous mixture with steam, thereby producing hydrogen; and
   (d) recycling the hydrogen produced in step (c) to said hydrogenation zone.

2. Process as in claim 1 wherein said oxygen gas is high purity oxygen.

3. Process as in claim 1 wherein the hydrogenation is carried out in the presence of from about 1,000 to about 10,000 standard cubic feet of hydrogen per barrel of liquid hydrocarbon.

4. Process as in claim 1 wherein step (c) is carried out in the presence of a shift catalyst at a superatmospheric pressure substantially the same as that at which said hydrogenation is conducted, and the volume ratio of $$H_2O:CO$$

is at least about 1:1.

5. Process as in claim 1 wherein the gaseous mixture resulting from step (c) contains at least about 50 volume percent hydrogen.

6. Process as in claim 1 wherein said liquid hydrocarbon contains at least 2 percent by weight sulfur, whereby said gaseous product mixture separated in step (b) also comprises hydrogen sulfide, and said hydrogen sulfide is substantially completely removed from said gaseous mixture prior to performing step (c).

7. Process as in claim 1 wherein the gaseous mixture processed as in step (c) consists essentially of hydrogen, carbon monoxide and water vapor.

8. Process as in claim 4 wherein the pressure at which step (c) is carried out does not differ from the pressure at which the hydrogenation reaction is conducted by more than about 300 p.s.i.

9. Process as in claim 1 wherein said liquid hydrocarbon in admixture with hydrogen and oxygen gas is flowed upwardly through an ebullated bed of particulate hydrogenation catalyst contained within a hydrogenation zone maintained at a temperature of from about 400° F. to about 1500° F. and a total pressure of from about 800 p.s.i.g. to about 5000 p.s.i.g., the partial pressure of hydrogen being from about 400 p.s.i. to about 4000 p.s.i.

References Cited

UNITED STATES PATENTS 3,202,603    8/1965    Keith et al. _____ 208—108
3,224,958   12/1965    Schlinger _____ 208—78

DELBERT E. GANTZ, *Primary Examiner.*

H. LEVINE, *Assistant Examiner.*